UNITED STATES PATENT OFFICE.

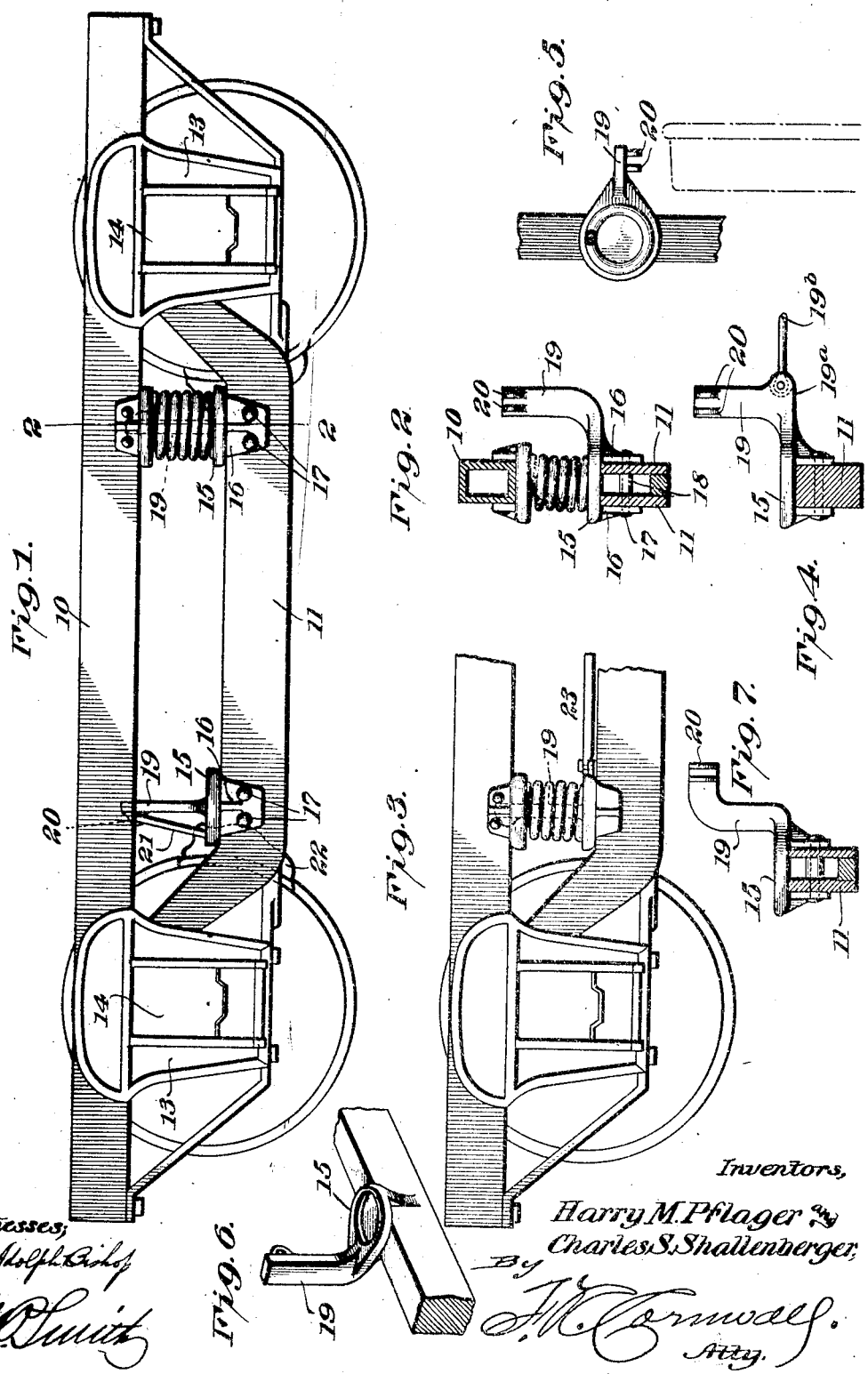

CHARLES S. SHALLENBERGER AND HARRY M. PFLAGER, OF ST. LOUIS, MISSOURI, ASSIGNORS TO THE COMMONWEALTH STEEL COMPANY, OF ST. LOUIS, MISSOURI, A CORPORATION OF NEW JERSEY.

CAR-TRUCK.

1,060,370.  Specification of Letters Patent.  Patented Apr. 29, 1913.

Application filed August 2, 1912. Serial No. 712,892.

*To all whom it may concern:*

Be it known that we, CHARLES S. SHALLENBERGER and HARRY M. PFLAGER, citizens of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a side elevational view of a car truck equipped with the combined spring seats and brake hanger brackets, as contemplated by our invention. Fig. 2 is a vertical section taken on the line 2—2 of Fig. 1. Fig. 3 is a side elevational view of a portion of a truck, and showing a modified form of the combined spring seat and brake hanger bracket. Fig. 4 is a cross-sectional view showing our improved brake hanger bracket applied to a single equalizer bar, and showing a portion of a transversely disposed rod utilized as a connection between an oppositely disposed pair of the brackets. Fig. 5 is plan view of one of the combined spring seats and brake hanger brackets, and showing its relative position with respect to the car wheel. Fig. 6 is a detail perspective view showing the combined spring seat and brake hanger bracket formed integral with the equalizer bar. Fig. 7 is a detail elevation of one of the hanger brackets designed particularly for use in connection with beamless brakes.

Our invention relates generally to car trucks, and more particularly to combined spring seats and brake hanger brackets that are carried by the equalizer bars of the truck.

The principal object of our invention is, to support the brake shoe at a fixed elevation with respect to the tops of the track rails so that said brake shoes, when applied to the peripheries of the car wheels, will always engage the same at the same relative points, regardless of the variation of the elevation of the vertically movable parts of the truck frame, and to this end we have provided a construction wherein the brake hanger brackets are attached through the spring seats directly to the equalizer bars that are arranged between the journal boxes at the sides of the trucks, and which equalizer bars maintain a fixed horizontal plane with respect to the tops of the track rails.

It has heretofore been the general practice to hang the brake beams and brake shoes from the truck frame, but such arrangement is not desirable owing to the fact that the height at which the truck frame is carried varies to a considerable degree, dependent upon the weight of the car body and its load and the variations in the elevation of the track.

The equalizer bars of a truck frame are the logical and most desirable points for the attachment of the brake hanger brackets by reason of their proximity to the wheels of the truck, and by reason of their fixed relation in elevation to the tread surfaces of the track rails, and we propose to combine the brake hanger brackets and the spring seats that are located on the equalizer bars, thereby providing a simple, strong and rigid construction which can be readily applied to the equalizer bars, and which will support the brake hangers in proper position with respect to the truck wheels.

To the above purposes our invention consists in certain novel features of construction and arrangement of parts hereinafter more fully described and claimed.

Referring to the drawings and particularly to the construction illustrated in Figs. 1 and 2, 10 designates the wheel pieces of a truck frame, 11 the parallel equalizer bars, 13 the pedestals and 14 the journal boxes positioned between the pedestals and upon which the ends of the equalizer bars engage.

The lower spring seats, as contemplated by our invention, are each composed of a horizontally disposed plate 15, and formed integral therewith is a pair of depending ears or brackets 16 which straddle the upper portions of the equalizer bars 11, and passing through these ears or brackets and said equalizer bars are horizontally disposed bolts or rivets 17. Located on these bolts or rivets between the equalizer bars are cylindrical spacing members 18.

Formed integral or fixed to the inside of each plate 15 is an inwardly and upwardly projecting bracket 19, and formed on the face thereof is a pair of lugs 20 to which the upper end of the corresponding brake hanger link 21 is pivotally connected. Carried by the lower end of this link is an ordinary brake shoe carrying head 22 which is adapted to engage the periphery of the adjacent wheel.

In the modified construction illustrated in Fig. 3 the spring seats on each equalizer bar are joined to each other by a connecting rod 23, which latter lies immediately above the equalizer bar, and where such construction is utilized, the fastening means comprising the rivets or bolts 17 can be dispensed with and the connecting rod 23 holds the spring seats against tilting movement upon the equalizer bars.

In the modified construction shown in Fig. 4 a combined spring seat and brake hanger bracket is shown positioned on a single equalizer bar, and the bracket is provided with a lug 19ª to which is attached one end of a rod 19ᵇ that extends across the car truck, and connects to the corresponding bracket on the opposite side of the truck frame. If desired this arrangement of connecting the oppositely disposed pairs of brackets can be combined with the connecting rods 23, and thus all four of the combined spring seats and brackets can be united by tie rods. In Fig. 6 I have illustrated a construction wherein the combined spring seat and bracket is formed integral with the equalizer bar.

By our improved construction the lower spring seat and brake hanger bracket are formed in a single piece, which can be readily combined with the equalizer bar, and as said equalizer bar always maintains the same elevation with respect to the tread surfaces of the track rails, the brake shoes are consequently held at fixed elevations with respect to the truck wheels, and therefore the brake shoes will be suspended and held in proper relation to the truck wheels, regardless of the varying elevation of the truck frame.

It will be readily understood that minor changes in the size, form and construction of the various parts of our improved car truck can be made and substituted for those herein shown and described without departing from the spirit of our invention, the scope of which is set forth in the appended claims.

We claim

1. In a car truck, the combination with an equalizer bar, of a spring seat on said equalizer bar, and a brake supported by said spring seat.

2. In a car truck, the combination with an equalizer bar, of a spring seat on said equalizer bar, and a brake carried by said spring seat.

3. In a car truck, the combination with an equalizer bar, of a combined spring seat and brake hanger bracket on said bar.

4. In a car truck, the combination with an equalizer bar, of an integral member applied to said bar, which member comprises a spring seat and a brake support.

5. In a car truck, the combination of a spring seat, and a brake hanger bracket fixed thereto.

6. In a car truck, the combination with a spring seat, and a brake hanger bracket, which parts are formed integral.

7. In a car truck, the combination with an equalizer bar, of spring seats, and brake supports, all of which parts are formed integral.

8. In a car truck, the combination with an equalizer bar, of spring seats positioned on said bar, and a member connecting one of said spring seats to the other.

9. In a car truck, the combination with an equalizer bar, of spring seats on said equalizer bar, brake supports carried by said spring seats, and a member connecting one of said spring seats to the other.

10. In a car truck, the combination of an equalizer bar, of a spring seat positioned on said bar, and a brake hanger bracket fixed to and extending inwardly and upwardly from the spring seat.

11. In a car truck, the combination of a spring seat, brackets thereon for engaging the sides of the equalizer bar, and a brake hanger bracket fixed to said spring seat and extending laterally and upwardly therefrom.

12. As a new article of manufacture, a combined spring seat and brake hanger bracket for car trucks comprising a plate and arm formed integral therewith, which arm projects laterally and upwardly from said plate.

13. As a new article of manufacture, a combined spring seat and brake hanger bracket for car trucks comprising a plate and an arm formed integral therewith, which arm projects laterally and upwardly from said plate, and a lug on the upper portion of said arm.

14. As a new article of manufacture, comprising an integral equalizer bar, spring seat and brake support.

15. As a new article of manufacture, a combined equalizer bar and brake support for car trucks, comprising a bar, a spring plate and a brake hanger bracket, integrally formed.

16. A device of the class described comprising a spring seat, a brake hanger bracket integral with and projecting upwardly from one side of said spring seat, and an integral lug on the upper portion of said bracket.

17. In a car truck, an equalizer bar, and a brake hanger bracket integral therewith.

18. In a car truck, the combination with equalizer bars, of spring seats on said bars, and tie rods connecting the corresponding pairs of spring seats.

19. In a car truck, the combination with equalizer bars, of brake hanger brackets on the equalizer bars, and transversely disposed tie rods connecting the brackets on one equalizer bar with the brackets on the opposite equalizer bar.

20. In a car truck, the combination with equalizer bars, of combined spring seats and brake hanger brackets on said equalizer bars, and tie rods connecting the combined spring seats and brackets on one equalizer bar with the combined spring seats and brackets on the opposite bar.

21. In a car truck, a spring seat, and a brake hanger bracket integral therewith.

22. In a car truck, a spring seat, a brake hanger bracket integral therewith, and a lug integral with the upper portion of said bracket.

In testimony whereof we hereunto affix our signatures in the presence of two witnesses, this 29th day of July, 1912.

CHARLES S. SHALLENBERGER.
HARRY M. PFLAGER.

Witnesses:
HAL C. BELLVILLE,
FRED H. BLANKENHORN.